(12) United States Patent
Heston

(10) Patent No.: US 6,231,298 B1
(45) Date of Patent: May 15, 2001

(54) ARTICLE PICK AND PLACE DEVICE

(76) Inventor: Stephen L. Heston, 1324 Jay Ct., West Linn, OR (US) 97068

( * ) Notice: Subject to any disclaimer, the term of this patent is extended or adjusted under 35 U.S.C. 154(b) by 0 days.

(21) Appl. No.: 09/361,012

(22) Filed: Jul. 23, 1999

Related U.S. Application Data

(63) Continuation of application No. 09/018,388, filed on Feb. 4, 1998, now Pat. No. 5,971,700.

(51) Int. Cl.[7] .................................................. B65G 47/00
(52) U.S. Cl. .................................. 414/751.1; 198/468.2; 198/750.11
(58) Field of Search .............................. 414/751.1, 796.2; 198/468.2, 468.4, 468.6, 750.11, 750.12, 750.14

(56) References Cited

U.S. PATENT DOCUMENTS

| 2,082,352 | * | 6/1937 | Neumair | 198/468.2 |
|---|---|---|---|---|
| 2,108,457 | * | 2/1938 | Tobia | 414/796.2 |
| 2,193,264 | | 3/1940 | Bashore . | |
| 2,815,870 | | 12/1957 | Laub III . | |
| 2,822,933 | * | 2/1958 | Pagdin | 414/796.2 |
| 2,841,433 | | 7/1958 | Pagdin et al. . | |
| 2,875,908 | | 3/1959 | Woodcock . | |
| 3,235,059 | | 2/1966 | Cooper . | |
| 3,471,038 | | 10/1969 | Verrinder . | |
| 3,782,564 | | 1/1974 | Burt . | |
| 3,836,018 | | 9/1974 | Dawson . | |
| 4,036,375 | | 7/1977 | McClintic et al. . | |
| 4,055,257 | | 10/1977 | Krebs . | |
| 4,214,848 | | 7/1980 | Verwey et al. . | |
| 5,649,804 | * | 7/1997 | Schychuck | 414/751.1 |

* cited by examiner

Primary Examiner—Gregory A. Morse
(74) Attorney, Agent, or Firm—Keith A. Cushing

(57) ABSTRACT

A top-picking palletizer and de-palletizer moves pallet layers along a fixed path by use of a single-dimension actuation system and top-picking lift head. The illustrated system includes an actuation assembly operated by a single reversible motor moving drive chains selectively in first and second directions. In a first direction, the lift head moves along the fixed path towards a first pick and place site and in the second direction moves along the fixed path toward a second pick and place site. By selectively engaging and disengaging the lift head, layers of items to be stacked or unstacked may be moved from one site to the other site, i.e., such as by palletizing and de-palletizing operations.

5 Claims, 9 Drawing Sheets

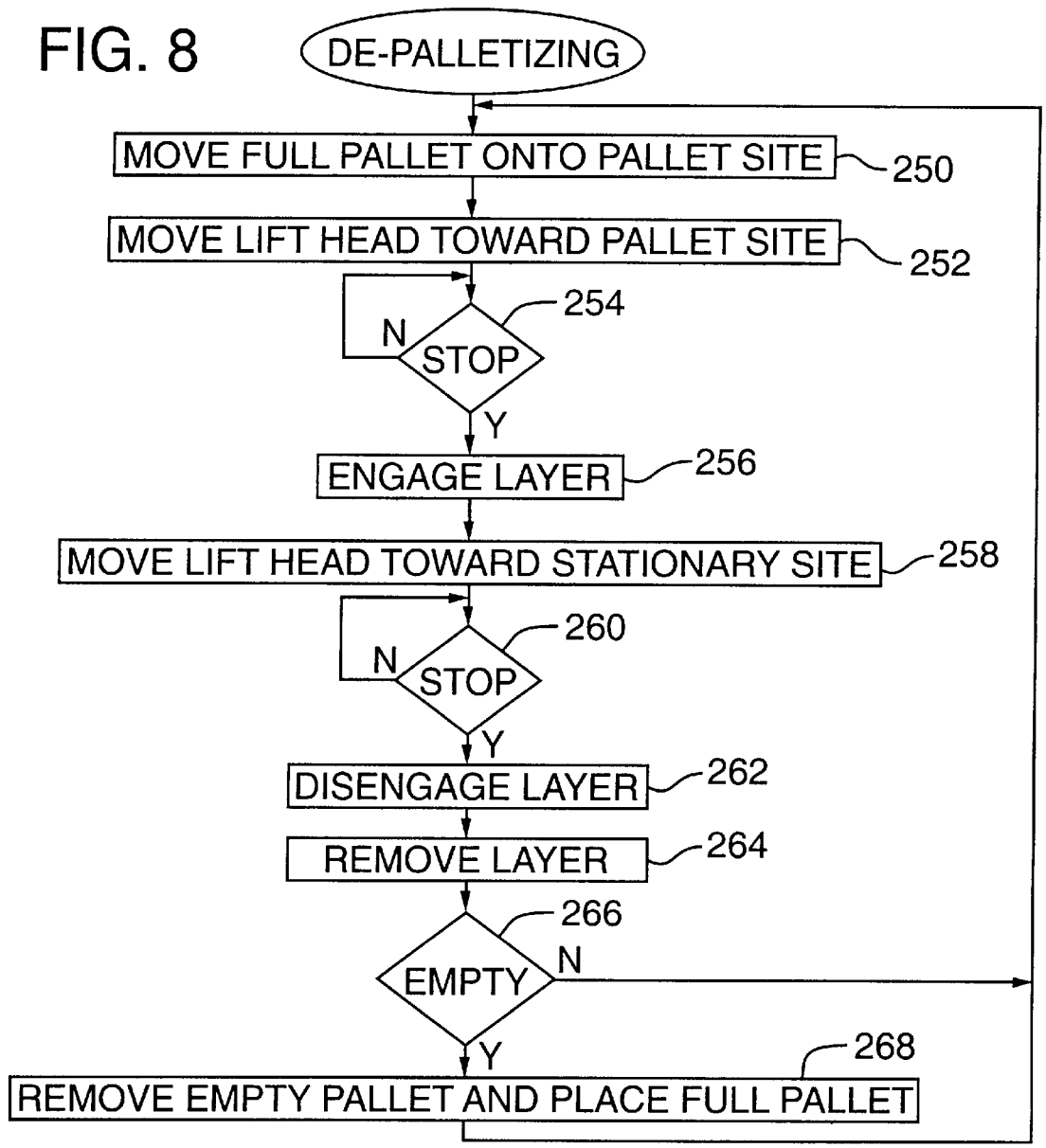

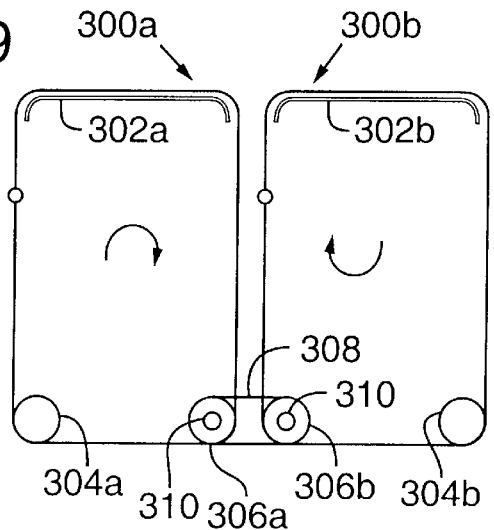
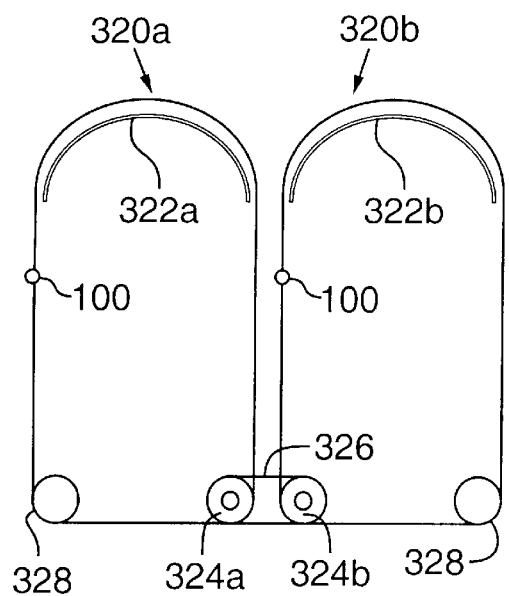
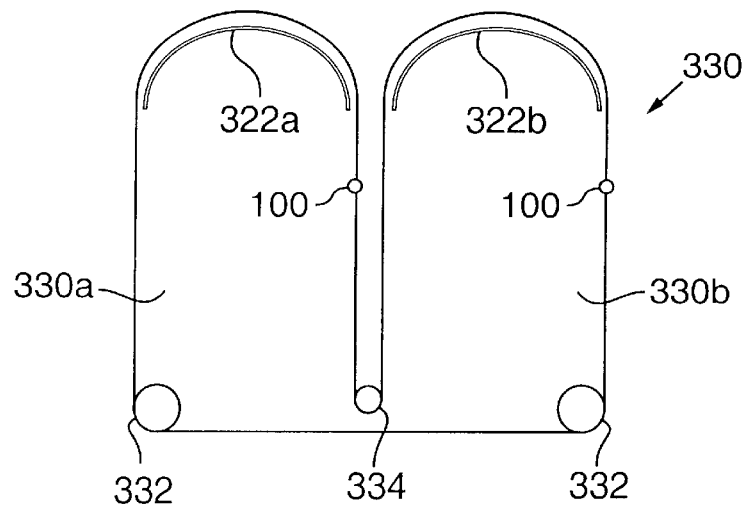

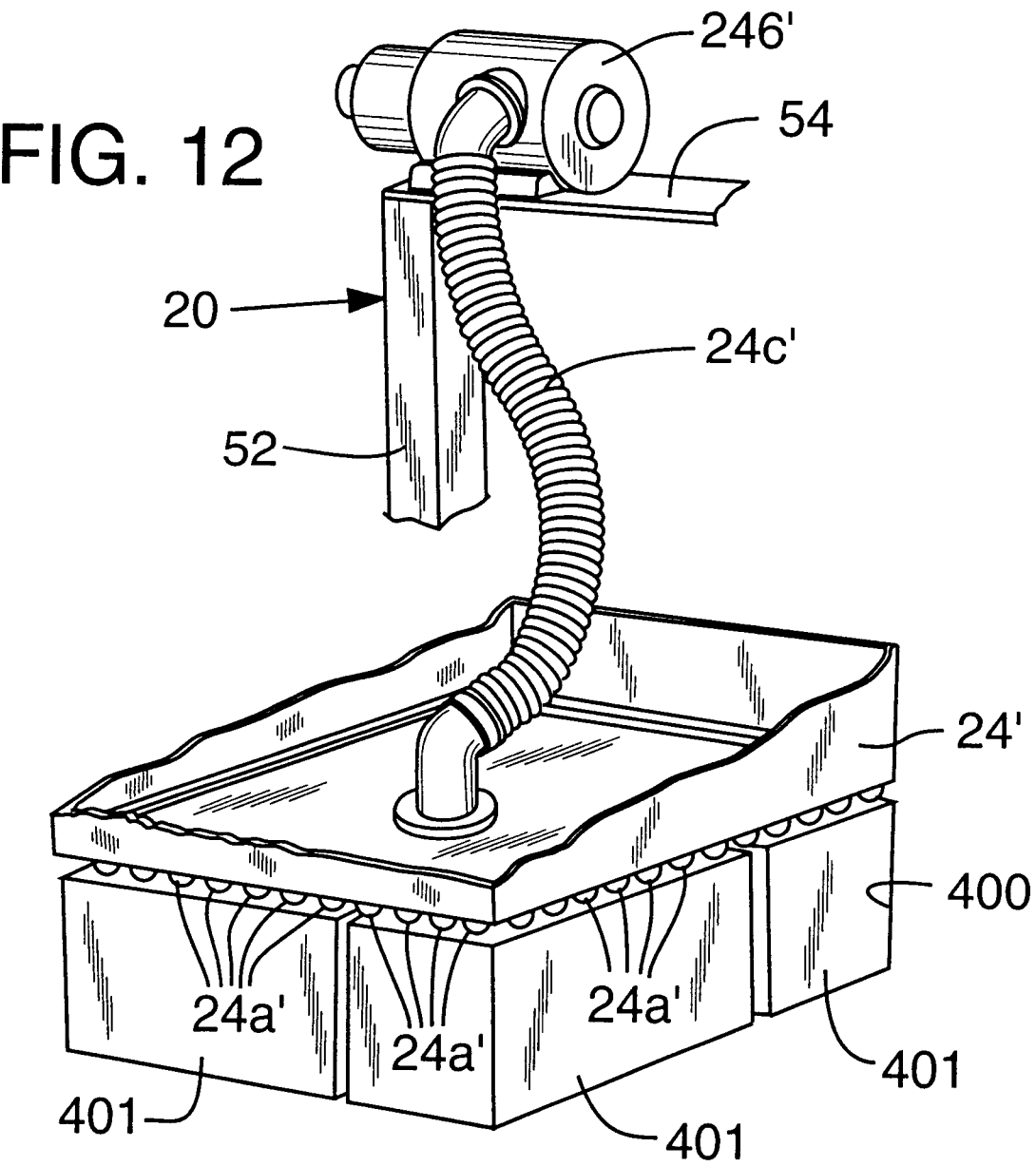

ARTICLE PICK AND PLACE DEVICE

The present application is a continuation of prior co-pending and allowed application Ser. No. 09/018,388 filed Feb, 4, 1998; now U.S. Pat. No. 5,971,700 entitled FIXED PATH PICK AND PLACE DEVICE; and naming as sole inventor the sole inventor named herein Stephen L. Heston.

BACKGROUND OF THE INVENTION

The present invention relates generally to article manipulation, and particularly to manipulation of entire layers of items during palletizing and de-palletizing operations.

A pallet is a standard support and carrier structure used in shipping. Pallets provide a support surface receiving items stacked for transport. Pallets include a space below the support surface receiving, for example, the tines of a forklift whereby the forklift lifts and moves the pallet with a stack of items thereon. Typically, items are boxes organized in layers upon the pallet. Efficient shipping of palletized items calls for efficient stacking of items on the pallet to minimize open space within the stack. Furthermore, by varying the orientation and/or pattern of items from layer to layer, a stable stack of items may be constructed upon a pallet. Accordingly, a variety of "box patterns" have emerged for efficient and stable packing together of items in item layers on a pallet. The standard pallet is used widely throughout the shipping industry and a variety of apparatus have evolved in relation to the standard pallet for stacking items upon pallets, i.e., palletizing, and for taking items from pallets, i.e., de-palletizing. Thus, palletizing, as used herein, refers to a process constructing a stack of items organized as layers on a pallet. De-palletizing, as used herein, refers to a process breaking-down or removing items from a stack of items on a pallet. Furthermore, the terms palletizing and de-palletizing as used herein shall not be limited to stacking and unstacking relative to a pallet, but shall include generally any stacking or unstacking process relative to articles organized as stacked layers.

A common arrangement for palletizing uses an "apron" to lift from below a layer of items. Once positioned below a layer of items, i.e., by sliding the apron between the layer and a supporting surface therebelow, the apron moves and places the item layer elsewhere. For example, to palletize, the apron moves the layer over a pallet or the top layer of a stack of layers on a pallet. The palletizing device then blocks the layer against movement while the apron slides out from underneath the layer. In this manner, the apron places an entire layer of items upon a pallet or upon the top layer of items on a pallet. Generally, an apron performs only palletizing operations because of the difficulty of inserting an apron between layers of an existing stack of items on a pallet.

Some palletizing and de-palletizing systems operate on an item-by-item basis. In other words, the system receives items individually and constructs, in a palletizing mode of operation, each layer item-by-item on the pallet itself. Similarly, in a de-palletizing mode of operation the system removes items individually from the pallet stack. As may be appreciated, such palletizing and de-palletizing systems are expensive and include complex mechanical and associated control arrangements. With such complex mechanical structures and control arrangements comes more opportunity for malfunction. Complex mechanical structures and control arrangements also significantly increase the cost of manufacture and operation.

U.S. Pat. No. 3,782,564 entitled Product Picking Stacker Crane System, filed Sep. 27, 1971 by Harold S. Burt, shows an overhead crane system transferring item layers from one stack to an adjacent stack. The system is a dual actuator system requiring separate vertical movement actuators and horizontal movement actuators operating in coordination.

U.S. Pat. No. 3,836,018 entitle Discrete Article Palletizing and De-Palletizing apparatus, filed Nov. 5, 1973 by George J. Dawson, et al shows a palletizing device including a top-picking engagement mechanism and a dual actuation drive system, i.e., a horizontal actuation system and a separate vertical actuation system. The illustrated apparatus moves item layers between a first station and a second station.

Thus, article manipulation in the context of palletizing and de-palletizing generally requires relatively complex apparatus and associated complex control schemes. Devices using multiple actuators, e.g., gantry systems with x-y positioning of a load, result in relatively complex and expensive apparatus. Because such systems include separate actuation devices operating in different dimensions, e.g., separate devices for movement in an x dimension and a y dimension, such systems can cause abrupt transition in vertical or horizontal movement and thereby risk loss of a load. To avoid such abrupt transition in movement, elaborate coordination and control must be imposed upon the separate actuation devices to accomplish smooth transition in vertical and horizontal movement.

Thus, it would be desirable to provide a palletizing and de-palletizing apparatus having a simplified structural architecture and a simplified control scheme for reduced overall cost and reduced overall complexity with a smooth transition in movement of loads between pick and place sites.

SUMMARY OF THE INVENTION

An article pick and place device includes an article lift device and a guide constraining the lift device to a fixed path. The fixed path couples a first pick and place site and a second pick and place site whereby the article lift device selectively engages and disengages articles at the first pick and place site and at the second pick and place site. A bidirectional actuation device moves the lift device along the fixed path. A simple structure and control arrangement results with improved overall reliability and reduced overall size.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIGS. 7 and 8 illustrate by flow chart palletizing and de-palletizing operations, respectively, performed by the system of FIG. 1.

FIGS. 9–11 illustrate alternate chain arrangements for the palletizing and de-palletizing system of the present invention.

FIG. 12 illustrates an example of a lift head which may be used in the palletizing and de-palletizing system of the present invention.

DETAILED DESCRIPTION OF THE PREFERRED EMBODIMENT

Figure 1:
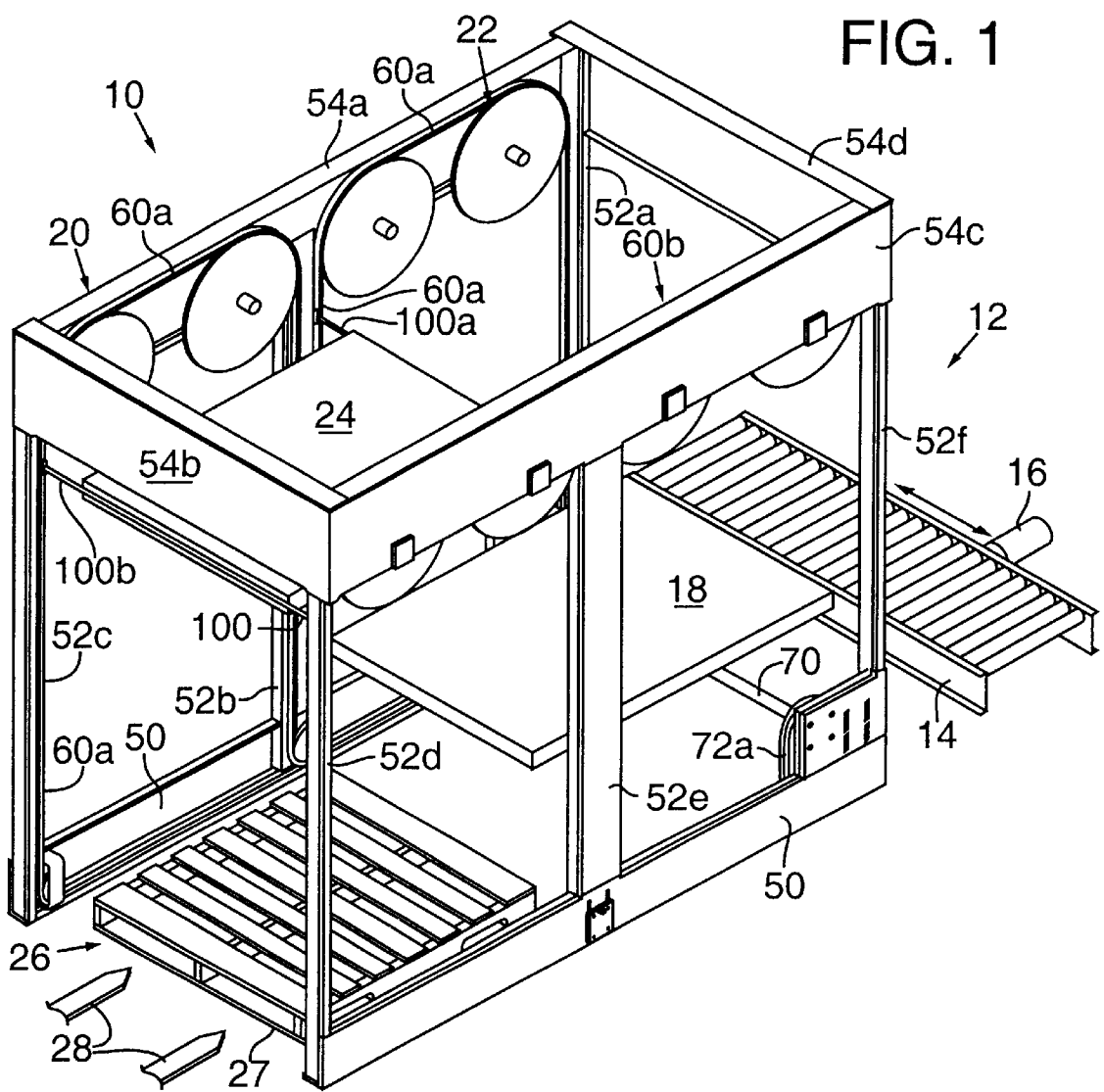
FIG. 1 illustrates in perspective a top-picking palletizer and de-palletizer system according to a preferred embodiment of the present invention.

FIGS. 1–4 illustrate a top-picking palletizer and de-palletizer system 10 according to a preferred embodiment of the present invention. As discussed more fully hereafter, top-picking palletizer and de-palletizer system 10 palletizes, i.e., builds a stack of items layer-by-layer upon a pallet, and also de-palletizes, i.e., removes layer-by-layer items from a stack of items on a pallet. A pallet layer transport system 12 includes a layer transport 14 driven by a reversible transport drive motor 16. Transport 14 interfaces with a stationary pick and place site 18 to deliver to site 18 or to collect from site 18 entire item layers. For the present discussion, it will be assumed that each item layer delivered to site 18 has an appropriate orientation on transport 14 and assumes an appropriate "box-pattern" and orientation at site 18. In other words, an upstream process (not shown) ensures that each item layer arrives at site 18 in an appropriate configuration for placement as a next layer in a given stack being constructed by top-picking palletizer and de-palletizer system 10.

A pallet carrier 28, e.g., fork lift, moves pallets 27, into and out of pallet site 26. Pallets 27 may be brought in empty and removed loaded such as during a palletizing operation or may be brought in full and removed empty such as during a de-palletizing operation. Pallet site 26, e.g., floor space, establishes an appropriate location for deposit of item layers or collection of item layers relative to a stack of item layers resting on a pallet 27 at site 26. As may be appreciated, each pallet 27 accommodates entry of carrier 28, i.e., the tines of a fork lift, whereby a pallet 27 may be moved onto or out of site 26 as necessary according to an ongoing palletizing or de-palletizing operation.

As viewed in FIG. 1, pallet layer transport system 12 occupies a rightward side of system 10 and pallet carrier 28 operates relative to a leftward side of system 10. As used herein, the terms "rightward" and "leftward" and the like shall be with reference to the rightward and leftward sides of system 10 as viewed in FIG. 1. During palletization, system 10 moves item layers leftward. During de-palletization, system 10 moves item layers rightward.

A frame structure 20 supports therein stationary pick and place site 18 and also supports a fixed-path actuation system 22. As discussed more fully hereafter, actuation system 22 operates in a single dimension, i.e., moves a lift head 24 carrying an item layer along a fixed path whereby a single scalar value represents the position of an item layer along this fixed path. More particularly, actuation system 22 carries a top-picking layer lift head 24 along a fixed path between stationary pick and place site 18 and a pallet support site 26. FIGS. 1–4 illustrate lift head 24 schematically, i.e., as a simple planar structure. It will be understood, however, that a variety of item layer lift mechanisms may be employed as mounted to system 10 in the fashion illustrated and described with respect to the schematic form of lift head 24. For example, lift head 24 may be a magnetic device as applied in the context of manipulating ferrous item layers. Lift head 24 can be a gripping device or a vacuum device (FIG. 12) as appropriate for a particular type of item layer article. In the illustrated embodiment, lift head 24 engages an entire item layer from above, i.e., a top-picking engagement, and moves an item layer selectively from site 18 upward, over, and down to a stack of item layers at pallet site 26 or moves an item layer selectively from a stack of item layers at pallet site 26 upward, over, and down to stationary pick and place site 18. Thus, top-picking palletizer and de-palletizer system 10 operates in either direction, i.e., palletizing when moving item layers leftward from site 18 to site 26 and de-palletizing when moving item layers rightward from a stack at site 26 to site 18.

Frame structure 20 includes a base 50 and a set of vertical uprights 52a–52f each extending upward from base 50. A set of horizontal beams 54a–54d couple together upper ends of the vertical uprights 52 and a simple generally box-form frame structure results. More particularly, uprights 52a and 52f occupy a rightward position, uprights 52c and 52d occupy a leftward position, and uprights 52b and 52e occupy a mid-position intermediate the leftward and rightward sides of system 10. Beam 54a couples uprights 52a, 52b, and 52c. Beam 54b couples uprights 52c and 52d. Beam 54c couples uprights 52d, 52e, and 52f. Beam 54d couples uprights 52f and 52a.

Figure 2:
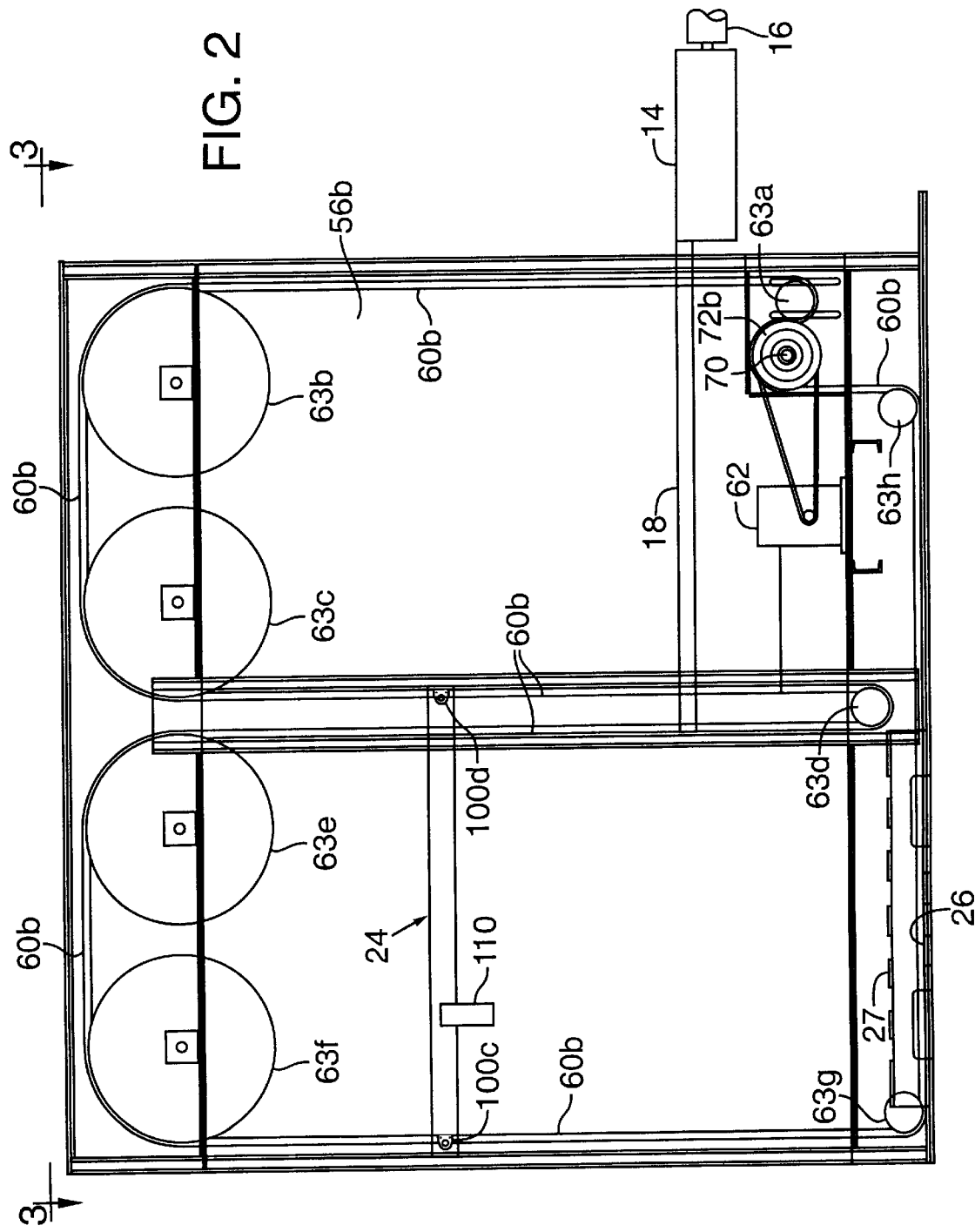
FIG. 2 illustrates a side view of the top-picking palletizing and de-palletizing system of FIG. 1.
Figure 3:
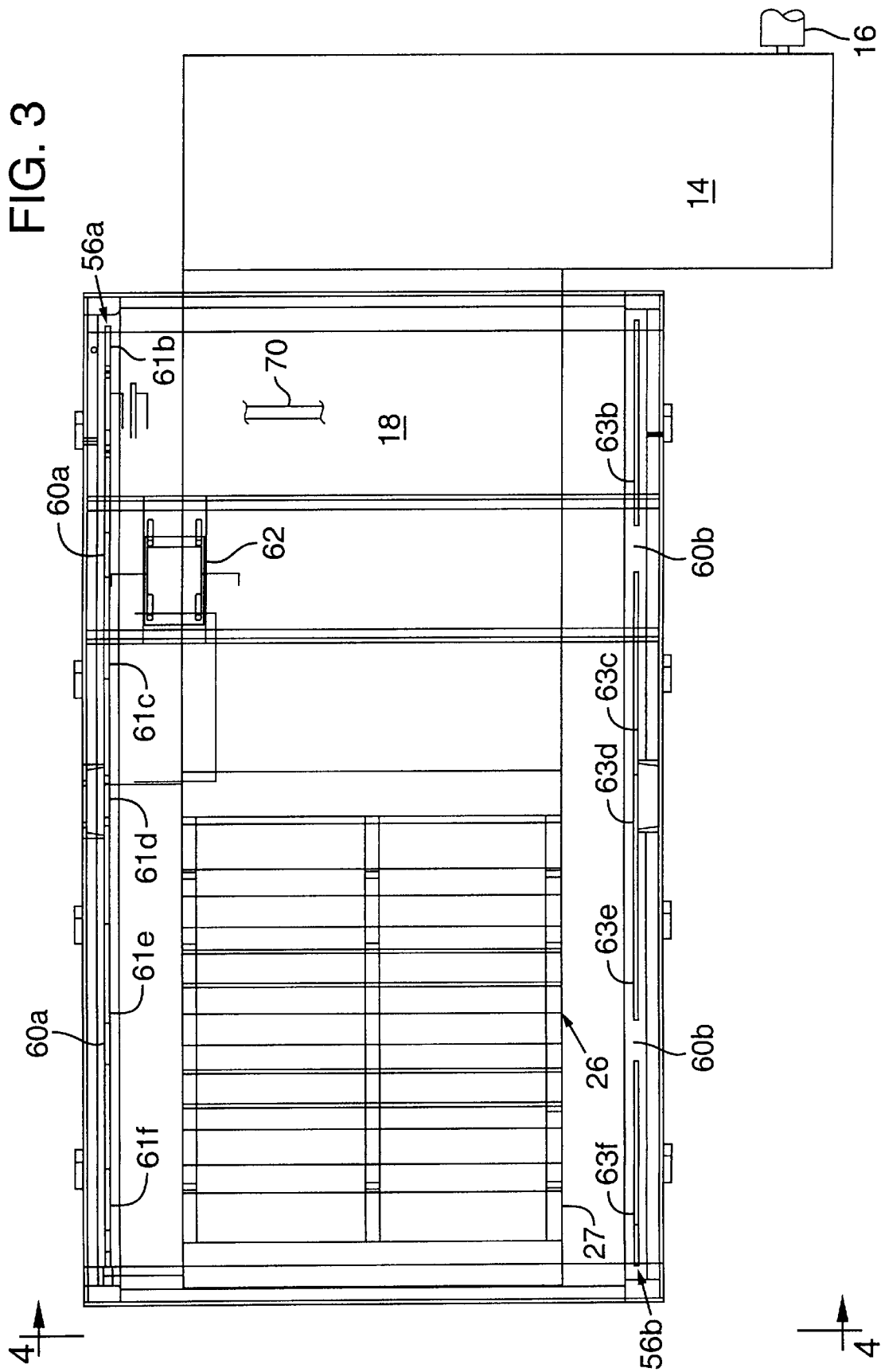
FIG. 3 is a top view of the palletizing and de-palletizing system of FIG. 1 as taken along lines 3—3 of FIG. 2.
Figure 4:
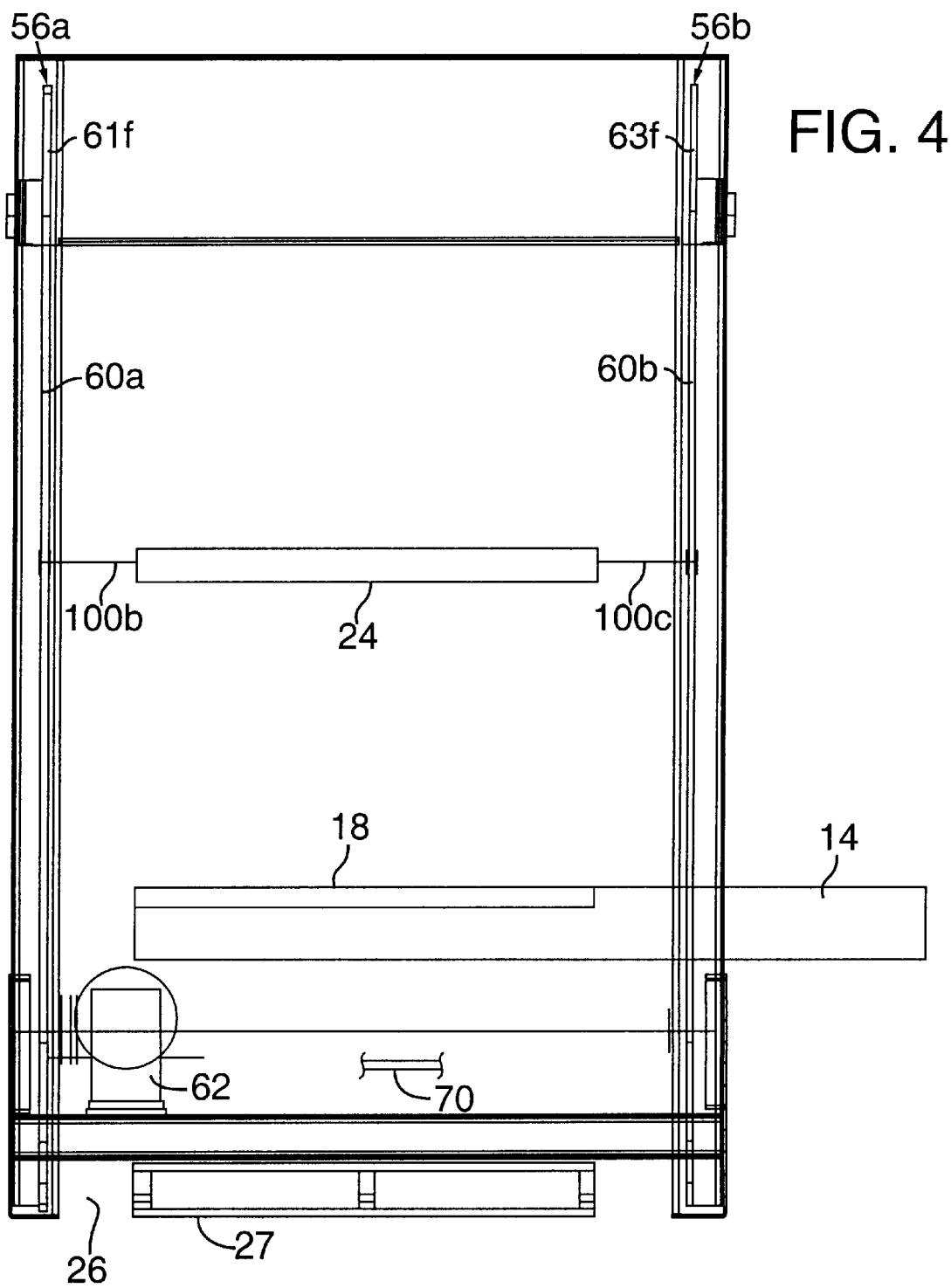
FIG. 4 is an end view of the palletizing and de-palletizing system of FIG. 1 as taken along lines 4—4 of FIG. 3.

A pair of chain guides 56a and 56b each establish a "loop" guide path for a corresponding one of chains 60a and 60b, respectively, carried thereby. Chain guides 56a and 56b each include a series of idle sprockets 61 and 63, respectively. More particularly, chain guide 56a includes idle sprockets 61a–61h. Chain guide 56b includes idle sprockets 63a–63h. Idle sprockets 63a–63h, best viewed in FIG. 2, represent also the arrangement for idle sprockets 61a-61h with respect to support of chain 60a. While a specific configuration for chain guides 56 and for chains 60 are shown and illustrated, the present invention may be implemented by other geometric configurations including variation in chain guide path shape and number of chains employed.

While the use of chains and chain guides or pulleys has been shown, it will be understood that a variety of alternative mechanisms may be used such cables, cogged timing belts, and guide tracks establishing a fixed path of movement for a lift head. Accordingly, the terms "chains" and "chain guides" shall also refer to any such alternative mechanism.

Figure 5:
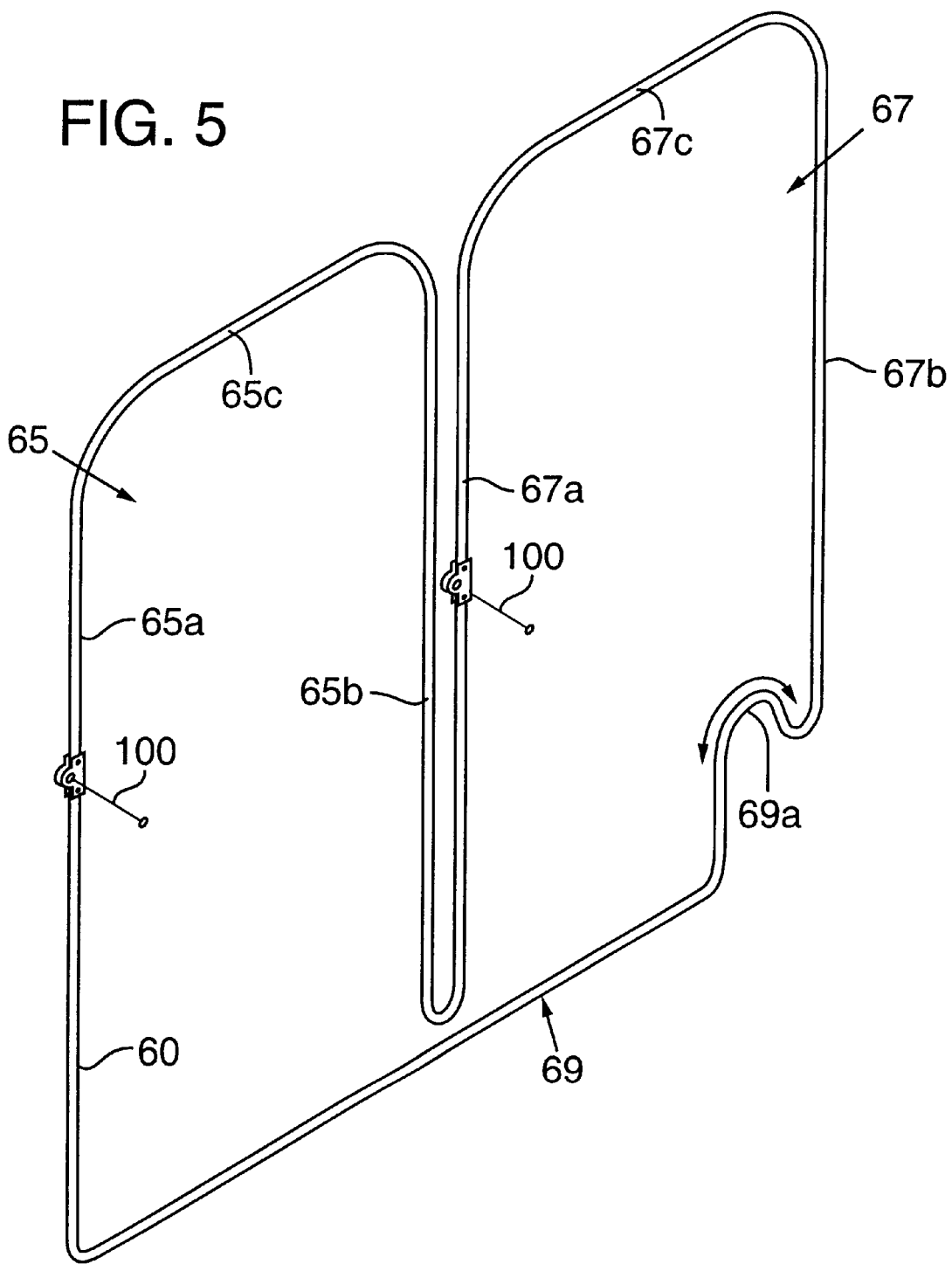
FIG. 5 illustrates a chain loop mountable within the palletizing and de-palletizing system of FIG. 1.

FIG. 5 illustrates separately and in perspective one of chains 60. The illustrated shape of a chain 60 in FIG. 5 corresponds to that shape assumed when mounted on the corresponding guide 56 of system 10. Generally, each chain 60 follows a closed-circuit path as defined by the corresponding guide 56. The geometric configuration includes a leftward rectangular portion 65 and a rightward rectangular portion 67. Each of portions 65 and 67 include a most leftward vertical section 65a and 67a, respectively. Similarly, each rectangular portion 65 and 67 includes a most rightward vertical section 65b and 67b, respectively. Vertical sections 65a and 65b couple across an upper horizontal section 65c. Vertical sections 67a and 67b couple across a upper horizontal section 67c. Generally, sections 65a–65c form an inverted U-shape. Sections 67a–67c also form an inverted U-shape. Vertical sections 65b and 67a couple at idle sprocket 61d, in the case of chain 60a, and at idle sprocket 63d, in the case of chain 60b. Vertical sections 65a and 67b couple across a lower generally horizontal section 69 including a drive section 69a. Chains 60 carry lift head 24 via pins 100 and a reversible drive motor 62 couples to chains 60 at drive section 69a for movement of lift head 24 along a fixed path between sites 18 and 26. The reversible aspect drive motor 62 allows bi-directional movement of lift head 24 along the fixed path between sites 18 and 26. By appropriately engaging and disengaging item layers with lift head 24 while moving pallet head 24 between sites 18 and 26, system 10 selectively palletizes and de-palletizes layer-by-layer pallet stacks.

In the particular configuration of guides 56 and chains 60 illustrated herein, each of chain guides 56 define a similar geometric pattern, i.e., a pair of generally rectangular, but rounded corner, sections 65 and 67. Chains 60a and 60b are in face-to-face relation. Drive motor 62 couples to a drive shaft 70. Drive shaft 70 carries drive sprockets 72a and 72b. Sprockets 72a and 72b engage chains 60a and 60b, respectively at drive sections 69a. Thus, drive shaft 70 drives and synchronizes chains 60a and 60b. The geometric pattern for each of the chain guides 56 is identical such that corresponding links or points including pins 100 on each of the chains 60 move in identical direction, i.e., along identical but offset paths.

Support pins 100a–100d couple lift head 24 to chains 60. More particularly, pins 100a and 100b couple lift head 24 to chain 60a and pins 100c and 100d couple lift head 24 to chain 60b. Pins 100 mounted to a given chain 60 occupy similar locations on rectangular portions 65 and 67, respectively. For example, pin 100a occupies vertical section 67a while pin 100b occupies vertical section 65a. Similarly, as pin 100a moves onto horizontal section 67c, pin 100b moves onto horizontal section 65c. In this manner, synchronized movement of chains 60 causes similar but offset movement of pins 100, and therefore movement of lift head 24 along a fixed path between sites 18 and 26. Pins 100 thereby provide vertical support for lift head 24 relative to chains 60, but must allow relative rotation therebetween. Thus, pins 100 may be fixed relative to either lift head 24 or to the corresponding one of chains 60, but must allow rotation relative to the other. During operation of motor 62 and synchronized movement of chains 60, lift head 24 assumes and maintains a horizontal orientation while moving along a fixed path between sites 18 and 26.

Upon activation of motor 62, pins 100 move in unison along the fixed path selectively between sites 18 and 26. From the particular position illustrated in FIGS. 1–4, pins 100 move from above site 26 vertically upward and eventually reach an upper position along guides 56 and then turn rightward along rounded portion of guides 56. Pins 100 then move in unison horizontally rightward. Eventually, pins 100 reach the rightward end of the upper horizontal portion of the corresponding guides 56 and move downward along a rightward vertical portion of the corresponding chain guide 56 over site 18. Reversing drive motor 62 causes similar, but opposite, movement of pins 100 and lift head 24.

Thus, system 10 uses a single actuation mechanism operating in one dimension, i.e., bi-directional movement of lift head 24 along a fixed path, between pick and place sites 18 and 26. While additional chains or motors could be employed, e.g., a separate motor for each chain loop 60, synchronization in movement of the chains 60 and pins 100 establishes a unified or single actuation system 22. As a result, a simple control scheme including start, stop and directional control relative to motor 62 satisfies necessary movement of lift head 24 in both palletizing and de-palletizing operations.

Lift head 24 carries a detector 110 (shown schematically in FIG. 2) indicating a given vertical separation between lift head 24 and a support surface therebelow, i.e., a surface at which a given pallet layer is to be placed or a surface at which a given pallet layer rests prior to engagement by lift head 24. Because items may vary in vertical dimension, the distance between lift head 24 and an appropriate support surface therebelow, e.g., site 18 or the upper surface of a stack of layers at site 26, varies. Thus, sensor 110 can be a simple limit switch adjustable in vertical position upon head 24 to account for the particular vertical dimension of items to be palletized or de-palletized. As may be appreciated, however, detector 110 can be a more sophisticated, e.g., mechanical plunger or general purpose distance-reading, device providing data indicating actual separation between lift head 24 and a given placement or picking surface. Furthermore, an encoder may be employed to specify in linear fashion, i.e., provide a single scalar value for, the position of lift head 24. Because this is a one-dimensional actuation system, i.e., movement along a fixed path, a single scalar value indicates the location of lift head 24 along that fixed path. In the preferred embodiment of the present invention, detector 110 is an optical device detecting when lift head 24 has reached a given position relative to an appropriate support surface therebelow, i.e., a position appropriate for either engaging or releasing an item layer to be picked up or deposited, respectively, at support surface therebelow.

With chains 60 in appropriate synchronization as illustrated and with lift head 24 appropriately mounted thereupon via pins 100, activation of drive motor 62 in a first direction moves lift head 24 along the fixed path toward site 18 while operation of motor 62 in the opposite direction moves lift head 24 along the fixed path toward site 26.

Figure 6:
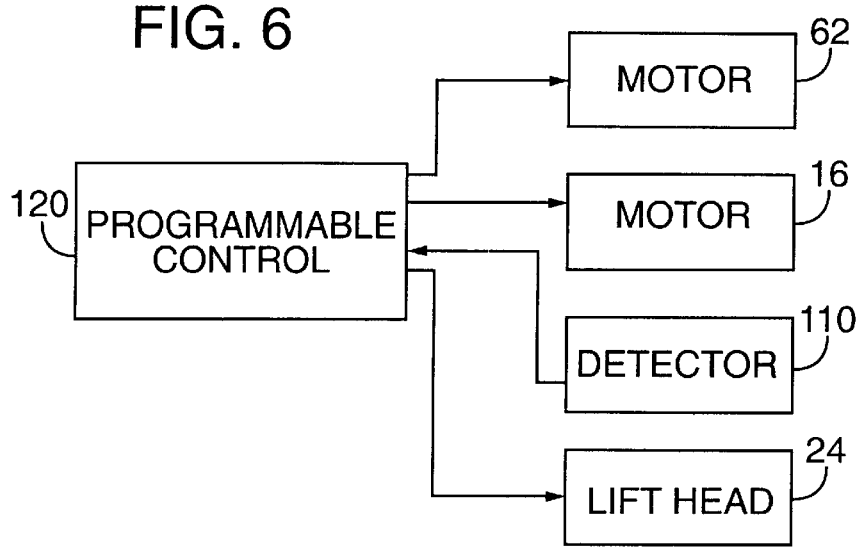
FIG. 6 illustrates by block diagram a control arrangement for the palletizing and de-palletizing system of FIG. 1.

A programmable control 120 (FIG. 6) couples to layer transport drive motor 16 to selectively move entire item layers on to and off of site 18. Programmable control 120 operates drive motor 62 to move lift head 24 in a selected direction along the fixed path coupling sites 18 and 26. Programmable control 120 also receives from detector 110 indication of the relative spacing between lift head 24 and a support surface therebelow, e.g., site 18 or the top layer in a pallet stack at site 26. System 10 thereby moves entire pallet layers onto site 18 and moves lift head 24 along the fixed path toward site 18. As lift head 24 approaches site 18 with an item layer thereat, for example, detector 110 eventually indicates to programmable control 120 suitable position in relation to site 18, and therefore the upper surface of the item layer then present at site 18. In response, programmable control 120 halts operation of drive motor 62. Programmable control 120 then activates lift head 24 to engage the layer present at site 18. Once engaged, programmable control 120 reverses operation of drive motor 62. Lift head 24 then moves upward along with the item layer just taken from site 18, moves horizontally to a position over site 26, and then moves vertically downward toward site 26 until detector 110 indicates to programmable control 120 that the item layer engaged by lift head 24 has reached a support level, i.e., has come to rest on a pallet if this is the first layer placed or has come to rest on the top item layer presently resting on a pallet at site 26. Programmable control 120 then instructs lift head 24 to release the item layer now resting at site 26. By receiving an appropriate sequence of layers at site 18, system 10 thereby stacks such layers on a pallet at site 26. A similar reverse or de-palletizing operation may be conducted by reversing the above described operation.

The radius of the upper idle sprockets, i.e., sprockets 61b, 61c, 61e, 61f, 63b, 63c, 63e, and 63f, determines the continuity of transition between vertical and horizontal movement for lift head 24. By providing "oversized" radii for these idle sprockets, lift head 24 undergoes a smooth transition between vertical and horizontal movement. The greater the radii in these idle sprockets, the smoother the transition between vertical and horizontal movement for a given item layer carried by lift head 24.

Chain guide geometry should provide vertical movement of lift head 24 directly above site 18 and above site 26. The length of vertical movement above site 26 varies as a function of the height of a stack of layers allowed on a pallet. In other words, lift head 24 movement should be vertical just prior to layer placement or layer collection and the extent of vertical movement established by system 10 should accommodate overall vertical variation in pallet stack height allowed.

The overall size of palletizing and de-palletizing system 10 is generally more compact than other palletizing and/or de-palletizing systems. The overall compact size of system 10 creates a more desirable shipping configuration for system 10 and thereby reduces cost of delivery to a remote site. The vertical height of system 10 corresponds generally to the maximum allowed height for a stack of item layers on a pallet 27 plus an allowance for the upper curved portion, i.e., rounded corners, of the fixed path. As discussed above, an exaggerated or increased radius path in transition between vertical and horizontal movement smoothes the transition and decreases the likelihood of a loss of item layer engagement.

Furthermore, because system 10 defines a generally box-form structure incorporation of additional safety barriers, e.g., clear plastic walls (not shown), comes at small marginal cost relative to incorporation of such safety features in conventional palletizing and/or de-palletizing equipment. More particularly, system 10 may be made less hazardous to workers by mounting wall structures to frame 20. In conventional palletizing and/or de-palletizing systems, no such frame structure exists and incorporating such safety walls comes a relatively greater marginal expense.

Figure 7:
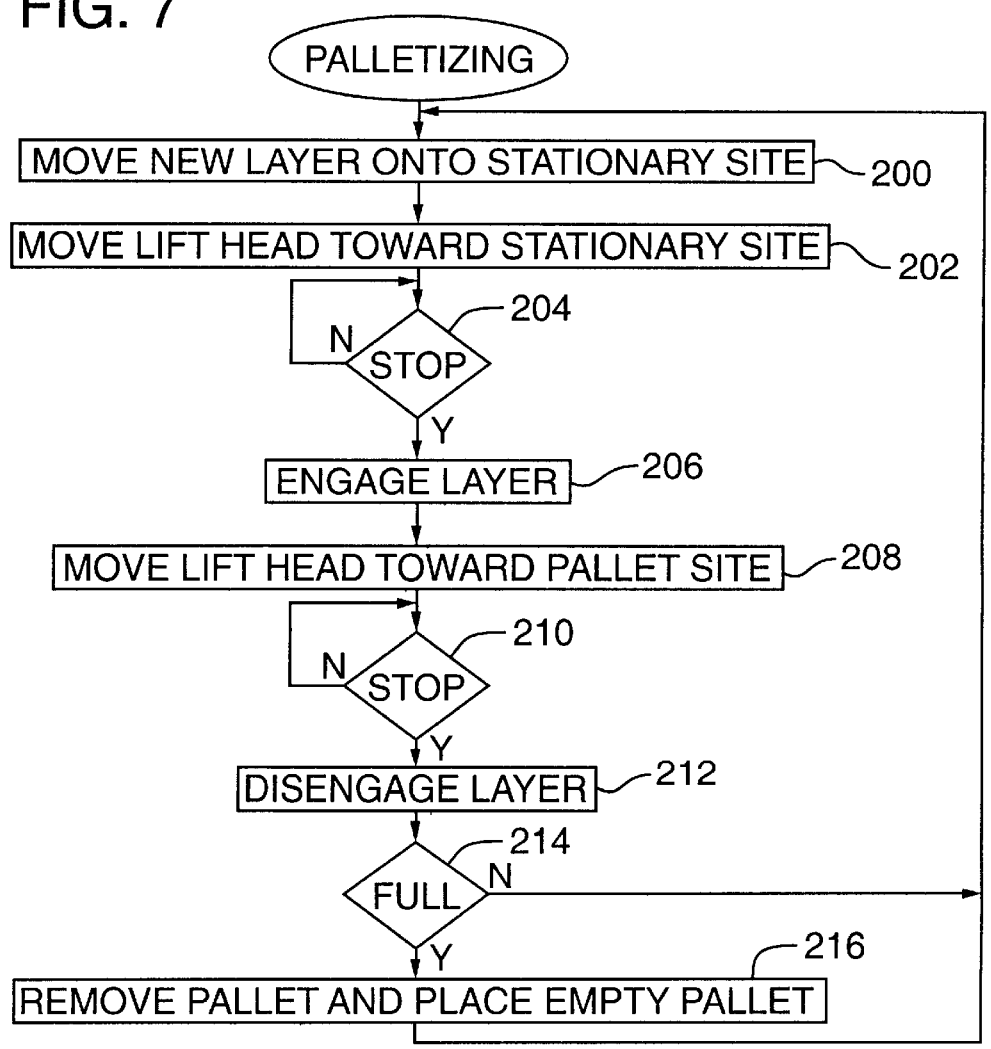

FIG. 7 illustrates by flow chart a control scheme used during a palletizing operation. In FIG. 7, processing begins in block 200 where programmable control 120 actuates layer transport system 12 to move a new item layer onto stationary site 18. In block 202, programmable control 120 moves lift head toward stationary site 18. As may be appreciated, the operation of block 202 can be conducted concurrently with the operation of block 200, but leaving lift head 24 sufficiently above stationary site 18 to allow placement of the new item layer at site 18. Processing loops at decision block 204 until lift head 24 has been moved to an appropriate position relative to site 18 to engage the item layer now resting at site 18. In other words, lift head 24 moves downward until detector 110 indicates to programmable control 120 that downward movement may stop. In block 206, lift head 24 engages the item layer at site 18. In block 208, programmable control 120 moves lift head 24 and the item layer carried thereby toward pallet site 26 along the fixed path as described herein. In other words, programmable control 120 activates in reverse direction drive motor 62 and lift head 24 moves upward, horizontally rightward as viewed in FIG. 1, and downward toward site 26. Processing loops at decision block 210 until detector 110 indicates to programmable control 120 that lift head 24 has achieved an appropriate position for releasing the item layer, i.e., has brought the item layer to rest on a pallet at site 26 or on the top layer of a stack of layers on a pallet at site 26. In block 212, programmable control 120 instructs lift head 24 to release the layer. As may be appreciated, lift head 24 may be immediately returned in a direction toward site 18. Also, while lift head 24 is moving a given layer toward site 26, programmable control 120 can move a next item layer on to site 18.

In block 214, programmable control 120 determines whether the pallet presently at site 26 is full. For example, if an encoder device is used to detect the position of lift head 24 then the height of a stack of layers on a pallet at site 26 may be inferred from chain position. Other pallet stack height detection devices may be used to indicate to programmable control 120 when a given pallet is full. If the pallet is not full, then processing returns from decision block 214 directly to block 200. Otherwise, processing passes through block 216 where pallet carrier 28 removes the full pallet from site 26 and places an empty pallet at site 26. As may be appreciated, pallet carrier 28 could be an automated device operating under the direction of programmable control 120 or be a forklift operated in conjunction with system 10 operation.

FIG. 8 illustrates by flow chart operation of system 10 in a de-palletizing mode. In FIG. 8, processing begins in block 250 where pallet carrier 28 moves a full pallet onto pallet site 26. In block 252, programmable control 120 moves lift head 24 toward site 26 and processing loops at decision block 254 until lift head 24 has reached an appropriate location for engaging the top layer of items on the pallet at site 26. In block 256, programmable control 120 instructs lift head 24 to engage the top layer at site 26 and, in block 258, instructs lift head 24 to move toward stationary site 18. Processing then loops at decision block 260 until lift head 24 has reached an appropriate location above site 18 to release the item layer. In block 262, programmable control 120 instructs lift head 24 to release the layer and the layer comes to rest on site 18. In block 264, programmable control 120 instructs layer transport 12 to remove the layer from site 18 via transport 14. In decision block 266, programmable control 120 determines whether the pallet at site 26 is empty. If empty, processing passes through block 268 where pallet carrier 28 removes the empty pallet from site 26 and places a full pallet at site 26. Processing then returns to block 250 where a next full pallet is moved onto pallet site 26. If, in decision block 266 programmable control 120, determines that the pallet at site 26 is not empty, then processing returns to block 252 where lift head 24 is returned to the pallet site 26 to collect the next layer thereat.

While illustrated herein with two chain loops 60 and two corresponding chain guides 56, a variety of alternative geometric arrangements and chain arrangements may be employed to implement the present invention. For example, FIG. 9 illustrates schematically a pair of chain loops 300, individually 300a and 300b each conforming generally to a rectangular, rounded corner, geometric pattern. The arrangement of FIG. 9 may be used to replace one of chain loops 60 as described herein above. Chain loops 300a and 300b are co-planar and each carry a pin 100 in similar locations. Chain guides 302a and 302b support the upper portion of chains 300a and 300b respectively. An idle sprocket 304 and drive sprocket 306 for each of chains 300a and 300b support the lower outer corners of chains 300a and 300b and maintain each of chains 300 in similar geometric configuration. Drive sprockets 306, individually 306a and 306b, couple together by means of a synchronization chain 308. A drive motor (not shown) couples to one of drive shafts 310 supporting drive sprockets 306. In this manner, chains 300a and 300b move in synchronization and pins 100 follow identical but offset paths. Drive shafts 310 would then couple a pair of chain loops 300a and 300b on each side of a palletizing and de-palletizing system whereby four chain loops would move in synchronization and four pins 100, carrying a lift head 24, would move in synchronization along a fixed path between pick and place sites.

FIG. 10 illustrates another alternative chain geometry similar to that of FIG. 9, i.e., including two separate chain loops 320a and 320b replacing one of chain loops 60 as discussed above. The "tombstone" arrangement of FIG. 10 differs from that of FIG. 9 in that it includes a single radius transition, i.e., no horizontal portion across the top of chain loops 320a and 320b. Accordingly, a curved chain guide 322a supports the upper portion of chain loop 320a and a curved chain guide 322b supports the upper portion of chain loop 320b. Each of chains 320 carry a pin 100 coupled to a lift head 24 and are driven in unison at drive sprockets 324a and 324b as tied together via synchronization chain 326. A pair of idle sprockets 328 establish the lower outer corners of each chain guide. Thus, an arrangement as illustrated in FIG. 10 replaces each of chain loops 60 as described above whereby four chains 320 carry four pins 100 and thereby move a lift head 24 along a fixed path between pick and place sites.

FIG. 11 illustrates a similar "tombstone-shaped" geometry as chain guides, but employs a single chain loop 330. Chain loop 330 includes a pair of curved chain guides 322a and 322b similar to that of FIG. 10 and providing support for an upper curved portion of a left portion 330a and of a right portion 330b of chain loop 330. Chain loop 330 also includes idle sprockets 332 at the lower outer corners and a drive sprocket 334 at a mid portion coupling adjacent vertical sections. Pins 100 as mounted in similar locations on portions 330a and 330b move in unison, i.e., identical direction along offset paths, as a rotational force is applied at drive sprocket 334.

While a variety of chain shapes and number of chains and support arrangements establishing guide paths may be established, generally pins 100 should move in similar but offset paths to establish a fixed path of movement for lift head 24 between pick and place sites 18 and 26. Accordingly, it will be appreciated that the present invention is not limited to a particular number of chains or particular chain geometry.

FIG. 12 illustrates by example one form of lift head 24 which may be applied to the palletizing and de-palletizing system 10 as described herein above. In FIG. 12, a vacuum lift head 24' includes on its lower surface a grid-array of suction orifices 24a'. As vacuum motor 24b' couples via hose 24c' to the array of suction orifices 24a'. Activating vacuum motor 24b' draws air into orifices 24a thereby engaging an item layer 400 including individual articles 401 organized according to a "box pattern." Vacuum motor 24b' mounts to frame 20 and flexibility in hose 24c' allows vacuum head 24' movement along a fixed path as described above during operation. Activating vacuum motor 24b engages layer 400 and deactivating vacuum motor 24b' releases layer 400. As may be appreciated, coupling control over vacuum motor 24b' to programmable control 120 (as discussed above) allows automated palletizing and de-palletizing by use of vacuum lift head 24' A more complete discussion of a vacuum lift head similar to that illustrated in FIG. 12 may be found in U.S. Pat. No. 3,780,884 issued Dec. 25, 1973 and entitled Article Transfer Device. The disclosure of U.S. Pat. No. 3,780,884 is incorporated herein by reference.

Despite an extremely simple control mechanism, i.e., a one dimensional fixed path bidirectional motor control, pallet layers enjoy a smooth ride in transition between sites 18 and 26. Achieving such smooth transitions in an x-y positioning system, e.g., overhead crane and lift apparatus, requires relatively complex coordination between x movement and y movement. Under the present invention, however, system 10 smoothly makes transition from vertical to horizontal movement and thereby minimizes a potential for loss of layers during transition. Because system 10 provides such smooth transition in movement between vertical and horizontal travel, it reduces the need to "tightly" grip a given layer. In other words, layers need not be "over-gripped" in order to prevent loss during sudden transition in vertical and horizontal travel and during abrupt starting and stopping conditions. This allows a more simplified and less damaging lift mechanism.

It will be appreciated that the present invention is not restricted to the particular embodiment that has been described and illustrated, and that variations may be made therein without departing from the scope of the invention as found in the appended claims and equivalents thereof.

What is claimed is:

1. An article pick and place device comprising:

an article engaging device;

a first site;

a second site;

a first transport moving along a fixed curvilinear path and including first and second similarly shaped curvilinear segments offset relative to one another in a first direction from said first site to said second site, said article engaging device being coupled to said transport at corresponding points of said first and second similarly shaped segments.

2. An article engaging device according to claim 1 wherein said transport is one of chain, cable, and timing belt constrained to move along said path.

3. An article engaging device according to claim 1 further comprising a second transport corresponding in shape to said first transport but offset in a second direction transverse to said first direction.

4. An article pick and place device according to claim 1 comprising a palletizer and wherein said article is a layer of items placed into a pallet load.

5. An article pick and place device according to claim 1 comprising a palletizer and wherein said article is a layer of items taken from a pallet load.

* * * * *